United States Patent [19]
Tomiyama et al.

[11] Patent Number: 5,313,334
[45] Date of Patent: May 17, 1994

[54] OBJECTIVE LENS MOVING ACTUATOR

[75] Inventors: Takamichi Tomiyama, Tokyo; Takatoshi Hirata, Kanagawa, both of Japan

[73] Assignee: Sony Corporation, Tokyo, Japan

[21] Appl. No.: 919,015

[22] Filed: Jul. 23, 1992

[30] Foreign Application Priority Data

Jul. 29, 1991 [JP] Japan .................................. 3-211606
Aug. 2, 1991 [JP] Japan .................................. 3-216282

[51] Int. Cl.$^5$ .............................................. G02B 7/02
[52] U.S. Cl. .................................. 359/824; 359/814; 369/44.16
[58] Field of Search ............... 359/813, 814, 823, 824; 369/44.15, 44.16

[56] References Cited

U.S. PATENT DOCUMENTS

| | | | |
|---|---|---|---|
| 4,766,583 | 8/1988 | Oinoue et al. | 359/814 |
| 4,882,723 | 11/1989 | Van Rosmalen | 359/824 |
| 5,050,964 | 9/1991 | Mori | 359/813 |
| 5,073,883 | 12/1991 | Mitsumori | 369/44.15 |

FOREIGN PATENT DOCUMENTS

| | | | |
|---|---|---|---|
| 0341936A2 | 11/1988 | European Pat. Off. | G11B 7/08 |
| 0435647A2 | 7/1991 | European Pat. Off. | G11B 7/08 |
| WO91/01549 | 2/1991 | PCT Int'l Appl. | G11B 7/08 |

OTHER PUBLICATIONS

Patent Abstracts of Japan, vol. 12, No. 441 (P-789), 21 Nov. 1988 & JP-A-63 168 848 (NEC Home Electronics), 12 Jul. 1988.

Patent Abstracts of Japan, vol. 9, No. 97 (P-352), 26 Apr. 1985 & JP-A-59 223 952 (Sanyo Denki K K), 15 Dec. 1984.

*Primary Examiner*—Loha Ben
*Attorney, Agent, or Firm*—Philip M. Shaw, Jr.

[57] ABSTRACT

An objective lens moving actuator comprises a movable member for supporting an objective lens, a resilient supporting member for resiliently supporting the movable member together with the objective lens such that the movable member having the objective lens can be moved in a first direction parallel to the optical axis of the objective lens and in a second direction perpendicular to the optical axis of the objective lens, a fixing member to which the base end of the resilient supporting member is fixed, an electromagnetic drive device for moving the resilient supporting member in the first and second directions together with the objective lens, and an adjusting member for rotating the resilient supporting member such that the optical axis of the objective lens has a predetermined skew angle.

13 Claims, 9 Drawing Sheets

OBJECTIVE LENS MOVING ACTUATOR

BACKGROUND OF THE INVENTION

1. Field of the Invention

The present invention relates to objective lens driving apparatus and, more particularly, to an objective lens moving actuator for use with an optical recording and/or reproducing apparatus, such as an optical disc player or the like for reading or writing an information signal by radiating a light beam on an optical disc in which there is recorded an information signal such as an audio signal, a video signal or the like.

2. Description of the Prior Art

In a conventional optical pickup used in an optical disc player, in order for a light beam emitted from a laser light source such as a semiconductor laser or the like to accurately track a recording track of an optical disc rotating at high speed, an objective lens for converging the light beam is displaced in perpendicular bi-axial directions such as the tracking direction and the focusing direction of the recording track by an objective lens driving apparatus known as a "bi-axial actuator". Further, an optical axis of the objective lens must constantly be held at an angle falling in a range of 90° ± about 0.1° relative to the signal recording surface of the optical disc. Considering a lens aberration of the objective lens itself, an aberration of other optical parts such as a collimator lens, beam splitter or the like, an inaccuracy of assembly parts such as an optical pickup device or the like, the bi-axial actuator needs to have an angle adjusting mechanism for adjusting two directions of the radial direction (known as a rolling direction) and the tangential direction (known as a pitching direction) in order to hold the objective lens at the above-mentioned angle relative to the optical disc.

FIG. 1 of the accompanying drawings shows an exploded perspective view of a conventional optical pickup device in which a bi-axial actuator is separated. The ordinary arrangement of the bi-axial actuator and the conventional angle adjusting mechanism will be described below (see U.S. Pat. No. 4,766,583).

The bi-axial actuator is generally depicted by reference numeral 1 in FIG. 1, and an objective lens 2 for converging a light beam emitted from a semiconductor laser (not shown) on a signal recording surface of an optical disc (not shown) is supported by a movable member 3 that is molded by a resin molding process. The movable member 3 is resiliently supported to an attaching mount 4 disposed at the rear side of the objective lens 2 by means of a suspension arm 5. The suspension arm 5 is formed of a pair of parallel flat, resin-molded members made of resins excellent in bending fatigue, such as polypropyrene, polyester elastomer or the like, and housed in a concaved recess 3a of the movable member 3 on its side opposite to the objective lens 2.

The suspension arm (only the upper supporting arm member is shown in FIG. 1) 5, the movable member 3 and the attaching mount 4 are coupled with one another by means of thin resilient displacing portions 6 and 7 so that they can be moved in the left and right direction at their central positions. The suspension arm 5 is composed of thin vertical resilient displacing portions 8 and 9 formed near the respective resilient displacing portions 6 and 7 and recess holes 8a and 9a for adjusting a resilient displacing force are formed through resilient displacing portions 8 and 9, respectively.

The attaching mount 4 is secured to a fixed chassis 10 by self-locking pins 11, 11. Rectangular bobbins 12, 12, each having a focusing drive coil 12a and a tracking drive coil 12b mounted on each surface thereof, are unitarily embedded in the left and right sides of the movable member 3. Yokes 13, 13 vertically implanted on the fixed chassis 10 are respectively inserted into the centers of the bobbins 12, 12 and magnets 14, 14 opposed to these yokes 13, 13 are respectively bonded to support members 15, 15 vertically implanted on the fixed chassis 10 in an opposing relation to the focusing drive coil 12a and the tracking drive coil 12b. A rear plate 16 unitarily formed with the chassis 10 is attached to the rear surface of the attaching mount 4 and a flexible printed circuit board (not shown) for connecting the coils is attached to the rear plate 16.

The bi-axial actuator 1 constructed as above moves the movable member 3 in the upper and lower direction by a magnetic action based on the direction of a current flowing through the focusing drive coil 12a and the direction of a magnetic flux of the magnet 14 when a focusing drive current based on a focusing error signal is supplied to the focusing drive coil 12a. Consequently, the movable member 3 resiliently displaces the resilient displacing portions 8 and 9 of the suspension arm 5 to move the objective lens 2 along the optical axis direction thereof, thereby effecting the focusing control.

Further, when a tracking drive current based on a tracking error signal is supplied to the tracking drive coils 12b, a left and right direction drive force occurs in the bobbins 12 due to a magnetic action caused in the direction of the current flowing through the coils 12b and the magnetic flux direction of the magnets 14. Consequently, the movable member 3 with the bobbins 12 resiliently displaces the resilient displacing portion 6 of the suspension arm 5 to move the objective lens 2 in the direction perpendicular to the optical axis, thereby effecting the tracking control.

The bi-axial actuator 1 thus constructed is mounted on an angle adjusting mount 17 by the chassis 10. That is, screws (not shown) are screwed into tapped-holes 17a of the angle adjusting mount 17 through two through-holes 10a (only one through-hole 10a is shown in FIG. 1) bored through the chassis 10 to thereby fix the chassis 10 to the mount 17. The angle adjusting mount 17 has an opening portion 18 formed therethrough at its position corresponding to the objective lens 2 of the bi-axial actuator 1 so as to introduce the laser beam from the objective lens 2 and an escape opening 18a communicated with the opening portion 18 so as to escape the printed circuit board (not shown) coupled to the coils. The periphery of the opening portion 18 projects to the rear surface side to form a spherical portion 19 of a convexed configuration.

The angle adjusting mount 17 having the bi-axial actuator 1 attached thereto is assembled onto a slide base 20 that is formed by a resin mold member. The slide base 20 has a concaved spherical socket 22 of arm configuration having an opening portion 21 formed therethrough at its center and a rack 23 formed on its one side portion that is used to move the slide base 20 along the radius direction of the optical disc in cooperation with a drive motor, not shown. The concaved spherical portion 19 of the angle adjusting mount 17 on which the bi-axial actuator 1 is supported is fitted into the concaved spherical socket 22 of the thus constructed slide base 20. The angle adjusting mount 17 is coupled to the slide base 20 by fastening a hole 17b of the mount 17 and a hole 20a of the slide base 20 with a pin p₁ and by fitting screws w₁, w₂ into two tapped holes 17c, 17d independently formed through the angle adjusting mount 17 by way of holes 20b, 20c from the rear surface of the slide base 20.

The angle adjustment of the angle adjustment mount 17 relative to the slide base 20 will be adjusted as follows, i.e., the adjusting operation of the angle of the objective lens 2 will be described as follows.

When screws W₁ and W₂ are driven in the positive or reverse direction and unscrewed by a tool such as a screw driver or the like from the rear wall of the slide base 20, the angle adjustment mount 17 is brought in slidable contact at its convex spherical portion 19 with the concave spherical cradle 22 about a pin P₁. In addition, the angle of the angle adjustment mount 17 can be adjusted relative to the slide base 20 while the mount 17 is being flexed. Consequently, the objective lens 2 of the bi-axial actuator 1 supported to the angle adjustment mount 17 can be held on the signal recording surface of the optical disc within a range of a set angle.

Since the above-mentioned conventional angle adjustment mechanism for the bi-axial actuator 1 has a laminated structure such that the chassis 10 of the bi-axial actuator 1 is mounted on the angle adjustment mount 17 and this angle adjustment mount 17 is assembled into the slide base 20, the entirety of the optical pickup is unavoidably increased in thickness in the height direction and accordingly, the optical disc player cannot be reduced in thickness satisfactorily. Further, since the conventional optical pickup needs the angle adjustment mount 17, the number of assembly parts is increased. Also, since the convex spherical portion 19 of the angle adjustment mount 17 is worked and the concave spherical socket 22, which is engaged with the convex spherical portion 19, is machined on the slide base 20, the metal molds for molding the angle adjusting mount 17 and the slide base 20 become complicated in structure and made expensive. There is then the problem such that the manufacturing cost of the optical pickup is increased.

Furthermore, since the angle of the angle adjustment mount 17 of the conventional angle adjustment mechanism is adjusted while the convex spherical portion 19 is slid against the concave spherical socket 22 with friction, the angle adjustment motion of the conventional angle adjustment mechanism becomes non-linear so that the angle of the objective lens is difficult to be adjusted with accuracy. In addition, the angle of the objective lens is adjusted by rotating the two screws W₁ and W₂, which becomes cumbersome.

OBJECTS AND SUMMARY OF THE INVENTION

Accordingly, it is an object of the present invention to provide an improved objective lens moving actuator in which the aforesaid shortcomings and disadvantages encountered with the prior art can be eliminated.

More specifically, it is an object of the present invention to provide an objective lens moving actuator in which an angle adjusting mount can be eliminated to reduce a thickness of an optical pickup.

Another object of the present invention is to provide an objective lens moving actuator in which the number of assembly parts can be reduced considerably.

Still another object of the present invention is to provide an objective lens moving actuator in which a metal mold for molding a slide base can be simplified in structure.

A further object of the present invention is to provide an objective lens moving actuator in which an angle of an objective lens can be adjusted with high accuracy.

Still a further object of the present invention is to provide an objective lens moving actuator which can be made inexpensive.

Yet a further object of the present invention is to provide an objective lens moving actuator which is highly reliable.

As a first aspect of the present invention, there is provided an objective lens moving actuator which comprises a movable member for supporting an objective lens, a resilient supporting member for resiliently supporting the movable member together with the objective lens such that the movable member having the objective lens can be moved in a first direction parallel to an optical axis of the objective lens and in a second direction perpendicular to the optical axis of the objective lens, a fixing member to which a base end of the resilient supporting member is fixed, an electromagnetic drive device for moving the resilient supporting member in the first and second directions together with the objective lens, and an adjusting member for rotating the resilient supporting member such that the optical axis of the objective lens has a predetermined skew angle.

In accordance with a second aspect of the present invention, there is provided an objective lens moving actuator which comprises a movable member for supporting an objective lens, a resilient supporting member for resiliently supporting the movable member together with the objective lens such that the movable member having the objective lens can be moved in a first direction parallel to an optical axis of the objective lens and in a second direction perpendicular to the optical axis of the objective lens, a fixing member having a first plane portion and a second plane portion formed vertically with respect to the first plane portion, a base end of the resilient supporting member being fixed to the second plane portion, and an electromagnetic drive device for moving the resilient supporting member in the first and second directions together with the objective lens, wherein the resilient supporting member is rotatably attached to the second plane portion so that the optical axis of the objective lens has a predetermined skew angle.

The above and other objects, features and advantages of the present invention will become apparent from the following detailed description of illustrative embodiments thereof when read in conjunction with the accompanying drawings, in which like reference numerals are used to identify the same or similar parts in the several views.

DESCRIPTION OF THE PREFERRED EMBODIMENTS

The present invention will now be described in detail with reference to the drawings.

Figure 1:
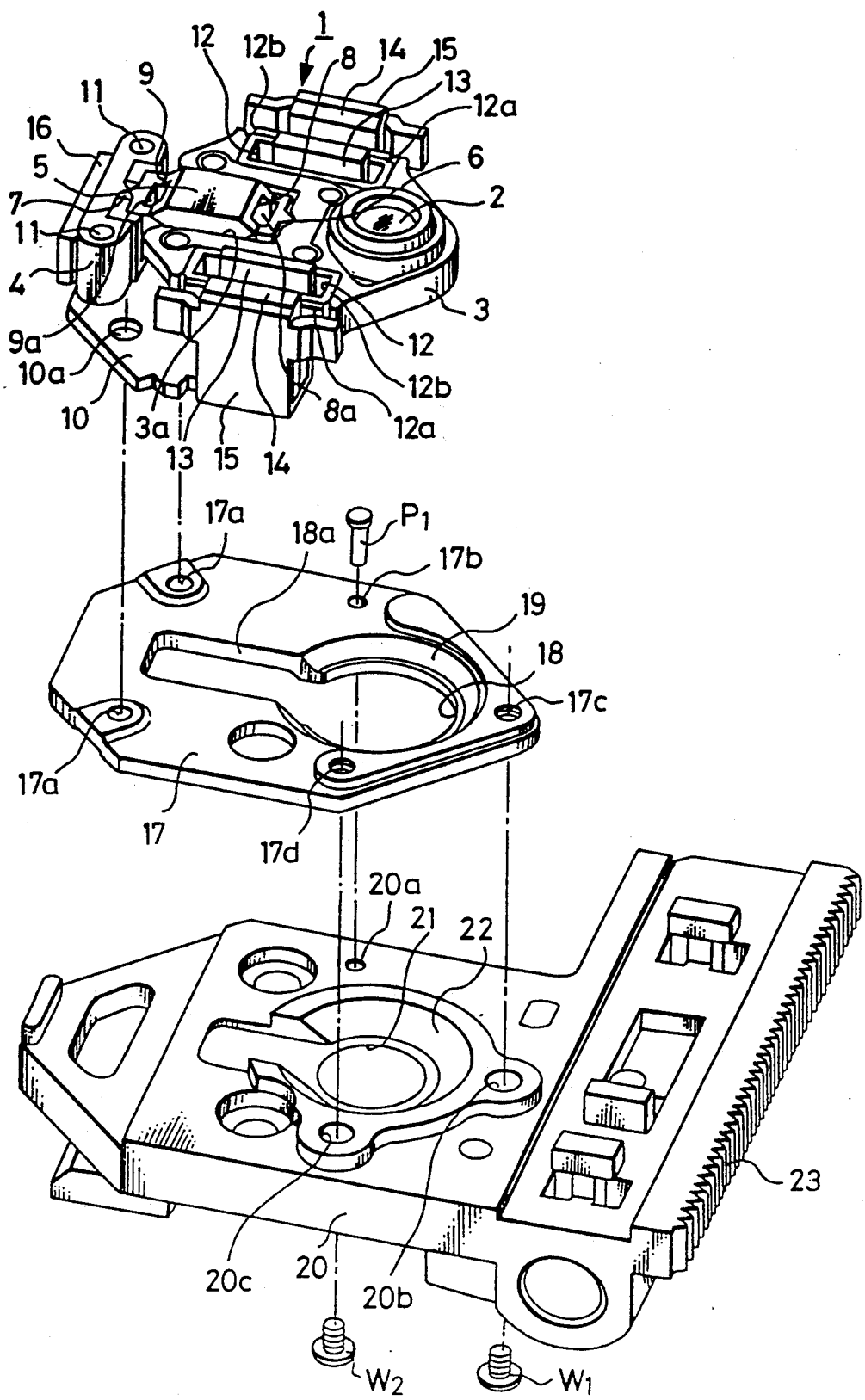
FIG. 1 is an exploded perspective view of an optical pickup device according to the prior art.
Figure 2:
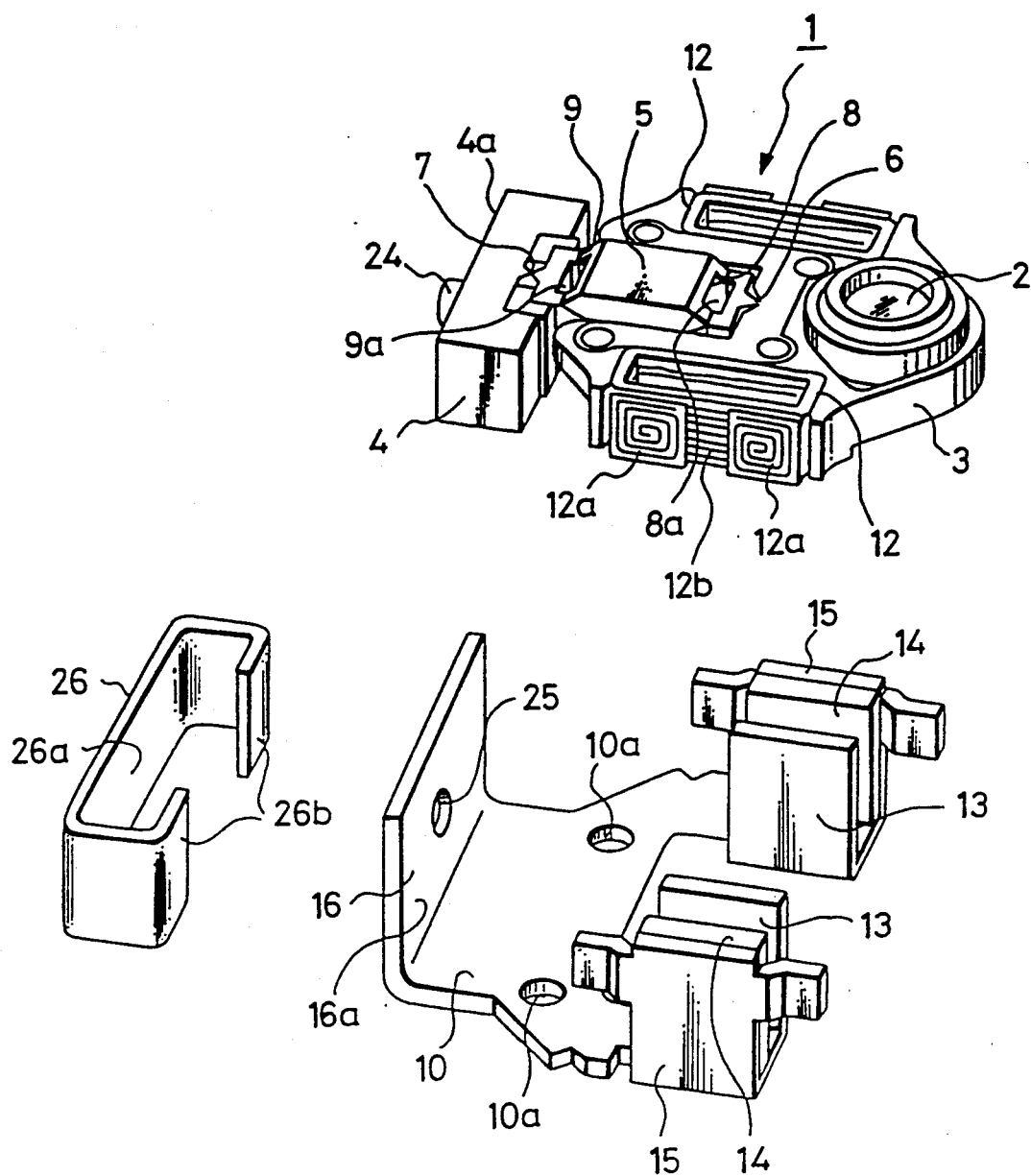
FIG. 2 is an exploded perspective view illustrating a first embodiment of an objective lens moving actuator according to the present invention.
Figure 3:
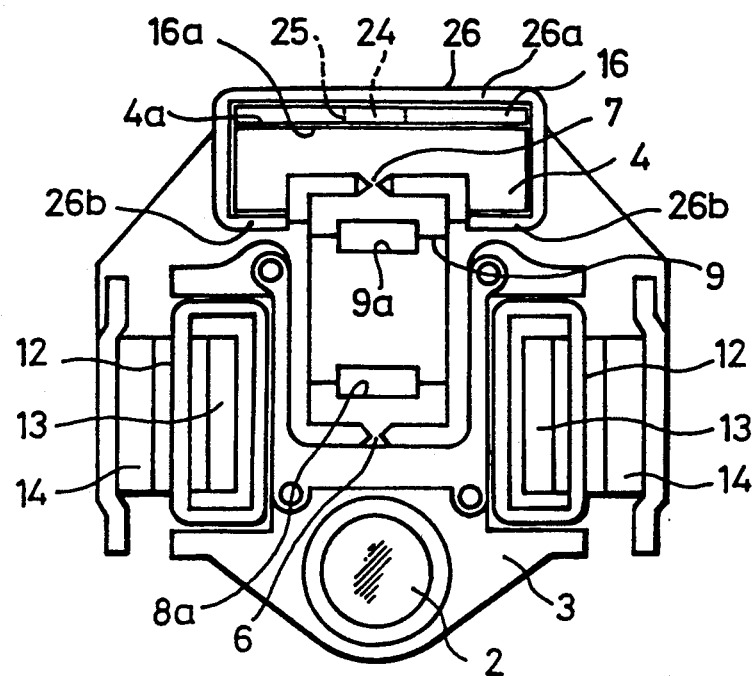
FIG. 3 is a plan view of the first embodiment of the objective lens moving actuator according to the present invention and illustrating its assembled state.
Figure 4:
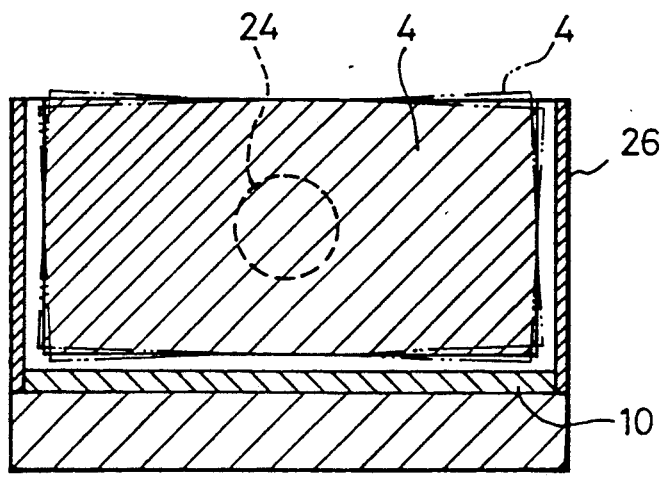
FIG. 4 is a cross-sectional view of an angle adjustment coupling portion of the first embodiment of the objective lens moving actuator according to the present invention.

FIG. 2 of the accompanying drawings is an exploded perspective view of a first embodiment of an objective lens moving actuator according to the present invention and illustrating the condition such that the objective lens moving actuator of the present invention is disassembled into a movable portion side and a stationary portion side. A structure of this objective lens moving actuator (bi-axial actuator) of the present invention is substantially identical to that of the conventional bi-axial actuator shown in FIG. 1. Therefore, in FIG. 2, like parts corresponding to those of FIG. 1 are marked with the same references and therefore need not be described in detail. First, the first embodiment of the objective lens angle adjustment mechanism according to the present invention will be described in detail below.

The objective lens angle adjustment mechanism is formed as a coupling portion that couples the attachment support member 4 of the bi-axial actuator 1, the rear surface of the attachment support member 4 in a parallel relation to the optical axis of the objective lens 2 and the rear plate 16 of the fixed chassis 10 erected in a facing relation to the rear surface of the attachment support member 4. More specifically, in this objective lens angle adjustment mechanism, the opposing surfaces of the rear surface of the attachment supporting member 4 and the rear plate 16 are respectively formed as flat vertical surfaces 4a and 16a. A shaft 24 of true circular configuration is projected from the central portion of the flat vertical surface 4a of the attachment supporting member 4 as an engagement portion. A hole 25 of true circular configuration is bored through the flat vertical surface 16a of the rear plate 16 as an engaged portion into which there is fitted the shaft 24. Then, the attachment supporting member 4 and the rear plate 16 are coupled by the engagement between the shaft 24 and the hole 25. In this case, the flat vertical surface 4a on the rear surface of the attachment supporting member 4 and the flat vertical surface 16a of the rear plate 16 are brought in close contact with each other and the length of the shaft 24 fitted into the hole 25 is properly selected so that the top portion of the shaft 24 can be prevented from outwardly projecting beyond the rear plate 16.

Since the objective lens angle adjustment mechanism is arranged as described above, the attachment supporting member 4 together with the movable member 3 resiliently supported thereby via the suspension arm 5 and the objective lens 2 can be rotated about the shaft 24 in the radial direction relative to the rear plate 16, i.e., in such a fashion that the optical axis of the objective lens 2 is moved in the left and right direction about the vertical position relative to the signal recording surface of the optical disc, thereby adjusting the angle of the objective lens 2 relative to the signal recording surface of the optical disc. In this case, since the flat vertical surface 4a on the rear surface of the attachment supporting member 4 is closely contacted with the flat vertical surface 16a of the rear plate 16, the attachment supporting member 4 is kept in horizontal property and can be prevented from being displaced in the tangential direction, i.e., in the pitching direction substantially. Accordingly, the angle of the objective lens 2 need be adjusted only in one direction, i.e., in the radial direction.

After the angle adjustment of the objective lens 2 is finished, a spacing between the shaft 24 on the rear side of the attachment supporting member 4 and the hole 25 bored through the rear plate 16 side is filled with an anti-rotating agent. After the anti-rotating agent is cured, the rear plate 16 and the attachment supporting member 4 are fitted into a clamp member 26 of substantially C-letter configuration with a pressure such that a rear surface 26a of the clamp member 26 is opposed to the rear plate 16 side and leg plates 26b, 26b thereof are opposed to the attachment supporting member 4 side, thereby the attachment supporting member 4 and the chassis 10 being formed as one body. Thus, the assembly of the objective lens moving actuator 1 is completed. The chassis 10 of the bi-axial actuator 1 arranged as above is directly assembled into a slide base not shown.

Figure 5:
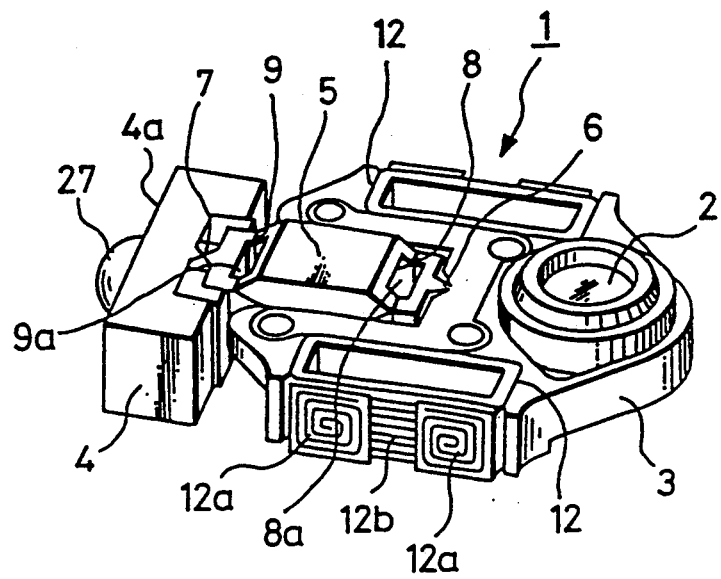
FIG. 5 is an exploded perspective view illustrative of a second embodiment of the objective lens moving actuator according to the present invention.
Figure 5:
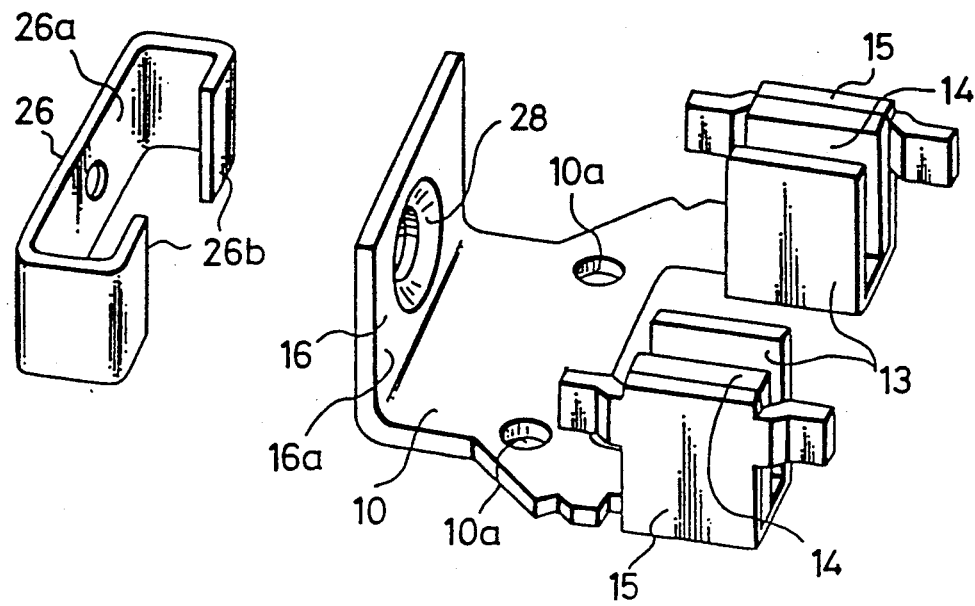

FIG. 5 of the accompanying drawings shows a second embodiment of the objective lens moving actuator according to the present invention. Also in the second embodiment of the present invention, identical parts and elements of the objective lens moving actuator, which is other mechanism than the objective lens angle adjustment mechanism, are marked with the same references as those of the prior-art example shown in FIG. 1 and therefore need not be described in detail, similarly to the first embodiment of the present invention.

Figure 6:
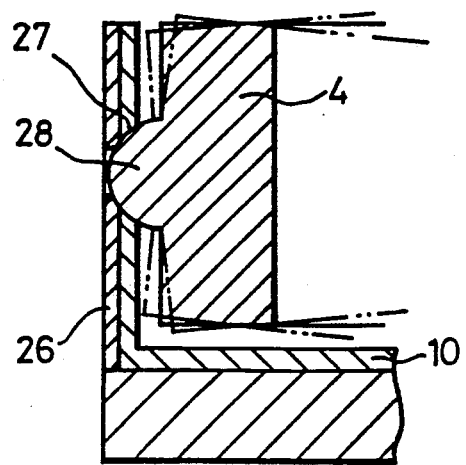
FIG. 6 is a cross-sectional view of the angle adjustment coupling portion of the second embodiment of the objective lens moving actuator according to the present invention.

In the second embodiment of the objective lens angle adjustment mechanism according to the present invention, a convex spherical portion 27 is projected on the rear wall of the attachment support member 4 and a concave spherical portion 28 into which the convex spherical portion 27 is fitted is formed on the rear plate 16 of the chassis 10, whereby the convex spherical portion 27 and the concave spherical portion 28 are fitted together so as to roll each other. Therefore, as shown in FIG. 6, the convex spherical portion 27 can freely rotate relative to the concave spherical portion 28 in an arbitrary direction, i.e., in the rotating direction and in the inclined direction. Hence, the attachment supporting member 4 can be rotated in the radial direction and in the tangential direction, i.e., in the two directions of the rolling direction and the pitching direction together with the objective lens 2 resiliently supported via the suspension arm 5. After the angle adjustment of the attachment supporting member 4 is finished, the convex spherical portion 27 and the concave spherical portion 28 are coated with the anti-rotating agent, whereafter the attachment supporting member 4 and the rear plate 16 are pressed and secured by the clamp member 26 of substantially C-letter configuration similarly to the above first embodiment. Thus, the assembly of the bi-axial actuator 1 is completed. Also in the second embodiment of the present invention, the chassis 10 of the bi-axial actuator 1 is directly assembled into the slide base (not shown).

In the first and second embodiments of the present invention, the objective lens 2 is supported by the suspension arm 5 made of a synthetic resin similarly to the prior-art example shown in FIG. 1. In these embodiments, the attachment supporting member 4 and the resilient displacement portions 6, 7 are unitarily formed with the suspension arm 5. There are then the problems such that the selection of synthetic resin becomes difficult and the structure of metal mold therefor becomes complicated. In addition, upon assembly, the above elements 4, 6, 7 and 5 are easily deformed, which unavoidably hinders the reliable skew angle adjustment. A third embodiment, which can solve this problem, will hereinafter be described with reference to FIGS. 7 to 13.

Figure 7:
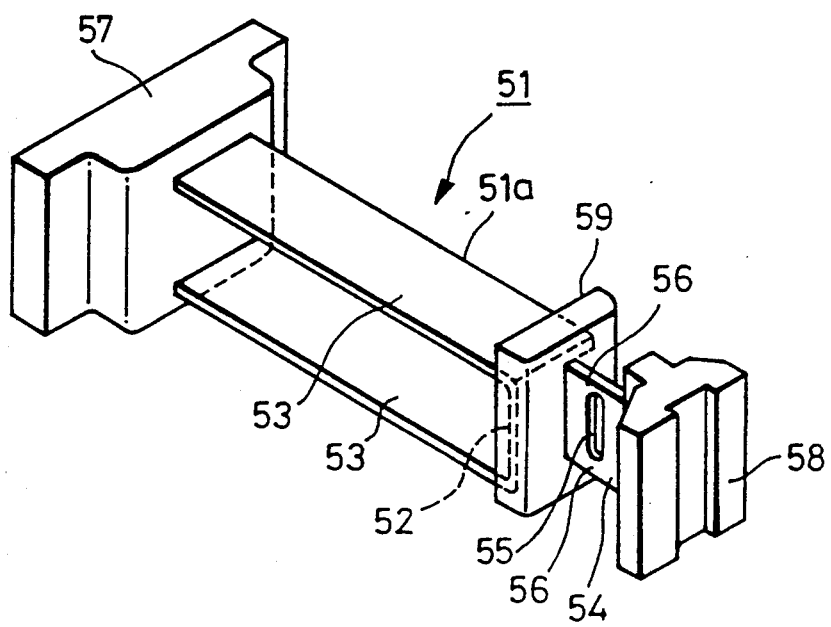
FIG. 7 is a perspective view of a suspension arm used in a third embodiment of an objective lens moving actuator according to the present invention.

FIG. 7 of the accompanying drawings is a perspective view of a suspension arm used in a third embodiment of the objective lens moving actuator according to the present invention.

As shown in FIG. 7, a suspension arm depicted by reference numeral 51 is composed of an arm portion 51a formed of a flexible non-magnetic metal thin plate and resin mold portions. The arm member 51a is made of, for example, a metal material such as phosphor bronze, beryllium copper or the like or a composite metal material thereof. The thickness of the arm member 51a falls in a range of 30 to 80μ depending on the kinds of metal material and is about 40μ.

The arm member 51a of the suspension arm 51 comprises a pair of first support arm members 53, 53 horizontally bent from a connecting portion 52 in a vertically opposing relation and a second support arm member 54 vertically bent from the connecting portion 52 relative to the first support arm members 53, 53 and extended in the opposite direction to the first support arm members 53, 53. More specifically, the first support arm members 53, 53 are each formed of an arm member of band-plate configuration so that the arm members 53, 53 are rendered flexible so as to be resiliently deformed in the plate surface direction. The second support arm member 54 has a punch-out aperture 55 formed therethrough in the width direction thereof so that narrow resilient displacement portions 56, 56 are formed on the upper and lower edges thereof. The second support arm member 54 provides a flexibility so that the resilient displacement portions 56, 56 are resiliently deformed in the plate surface direction thereof.

Figure 8:
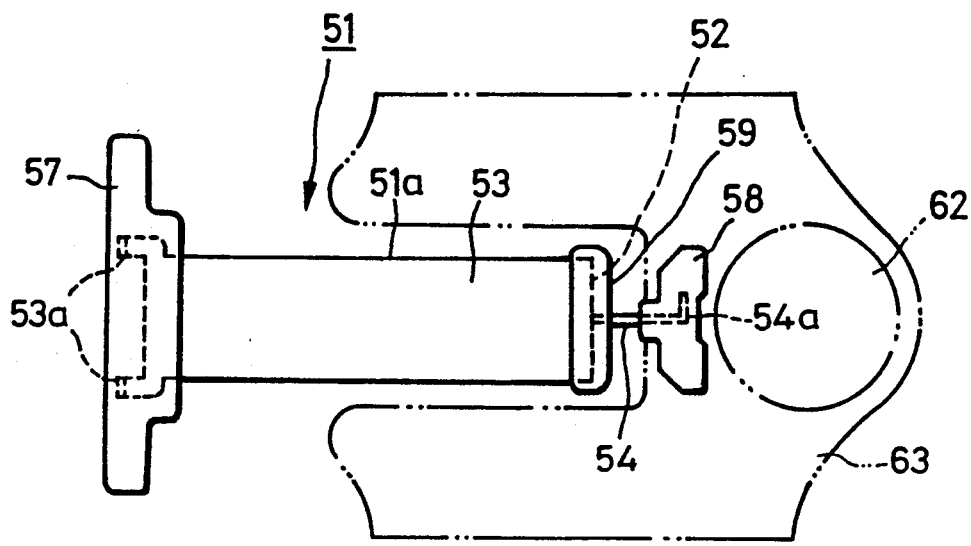
FIG. 8 is a plan view illustrative of a movable portion side of the third embodiment of the objective lens moving actuator according to the present invention.
Figure 9:
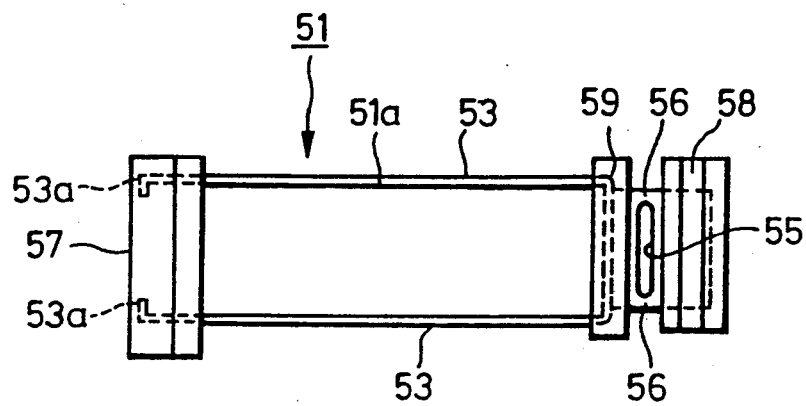
FIG. 9 is a side elevational view of the suspension arm used in the third embodiment of the objective lens moving actuator according to the present invention.

FIGS. 8 and 9 of the accompanying drawings show a plan view and a side elevational view of the suspension arm 51 of FIG. 7.

As shown in FIGS. 8 and 9, hook portions 53a, 53a are formed on the outer end portions of the first support arms 53, 53, respectively, and an attachment portion 57 is formed on the outer end portions of the first support arm members 53, 53 by a resin molding process so as to embed the hook portions 53a, 53a therein. Also, a hook portion 54a is formed on the outer end portion of the second support arm member 54, and an attachment portion 58 is formed on the outer end portion of the second support arm member 54 by the resin molding process so as to embed the hook portion 54a therein. The coupling portion 52 of the first and second support arm members 53, 54 is reinforced by a reinforcing member 59 that is molded by the resin molding process. The synthetic resin material for the attachment portions 57, 58 and the reinforcing portion 59 might be polyester-based resins such as polybutylene terephthalate (PBT) or the like having excellent heat-resistant property.

Figure 10:
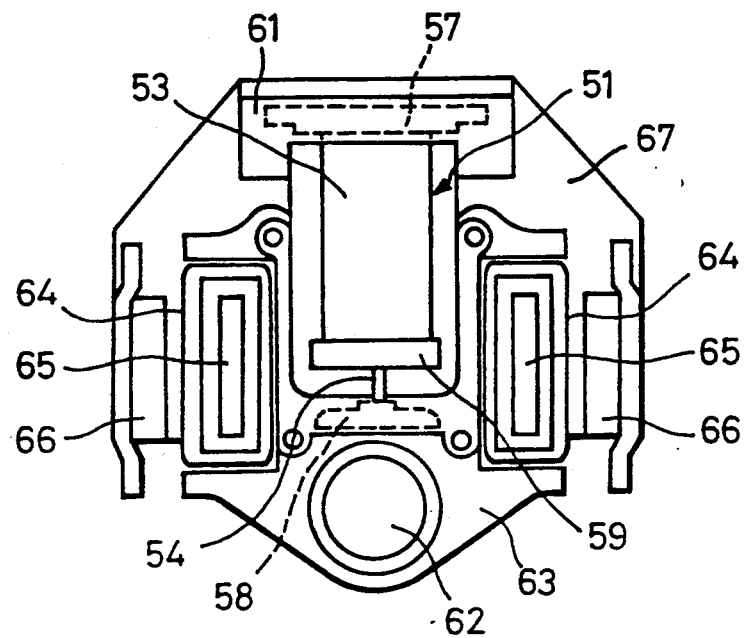
FIG. 10 is a plan view illustrative of the third embodiment of the objective lens moving actuator according to the present invention.

FIG. 10 of the accompanying drawings shows a plan view of a third embodiment of the present invention and illustrating the condition such that the suspension arm 51 mentioned above is assembled into the bi-axial actuator.

As shown in FIG. 10, the attachment portion 57 formed on the first support arm members 53 of the suspension arm 51 is molded to a fixed support member 61 that supports the suspension arm 51 in a cantilever fashion and the attachment portion 58 formed on the second support arm member 54 is molded to a movable member 63 on which there is disposed an objective lens 62. In FIG. 10, reference numerals 64, 65 depict a field coil and a yoke which are used to move the bi-axial actuator in the focusing direction and in the tracking direction, 66 a magnet and 67 a chassis on which there is mounted the bi-axial actuator.

Figure 12:
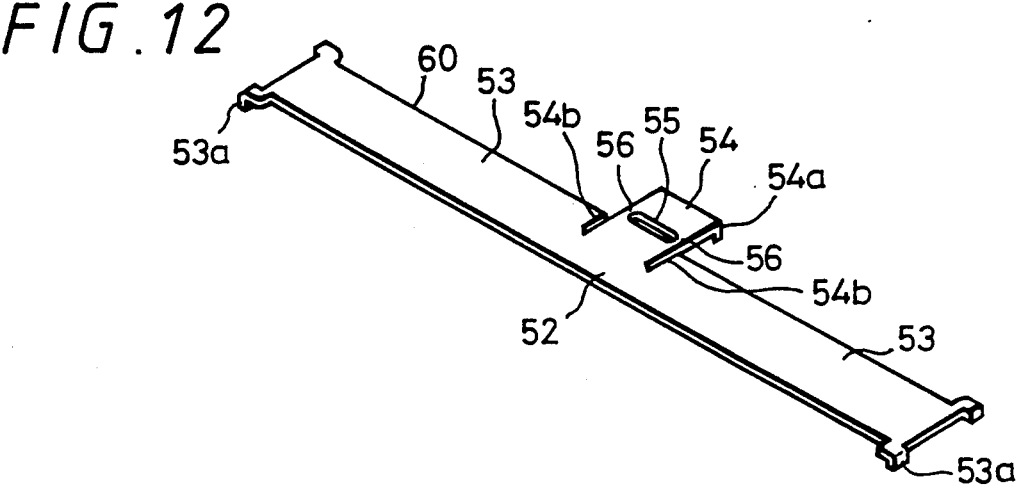
FIG. 12 is a perspective view of the arm member used in the third embodiment of the objective lens moving actuator according to the present invention and illustrating that the arm member is partially being bent.
Figure 13:
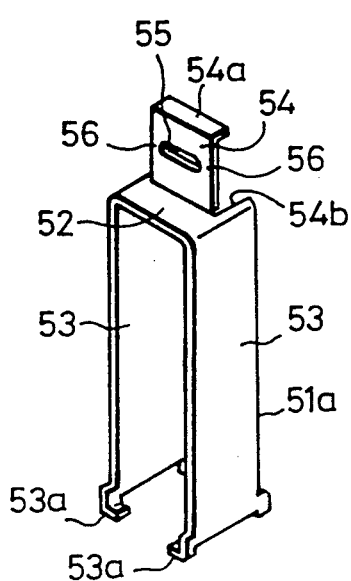
FIG. 13 is a perspective view of the arm member used in the third embodiment of the objective lens moving actuator according to the present invention and illustrating that the bending process of the arm member is finished.

The working process during which the suspension arm 51 is made will be described with reference to FIGS. 11 through 13.

Figure 11:
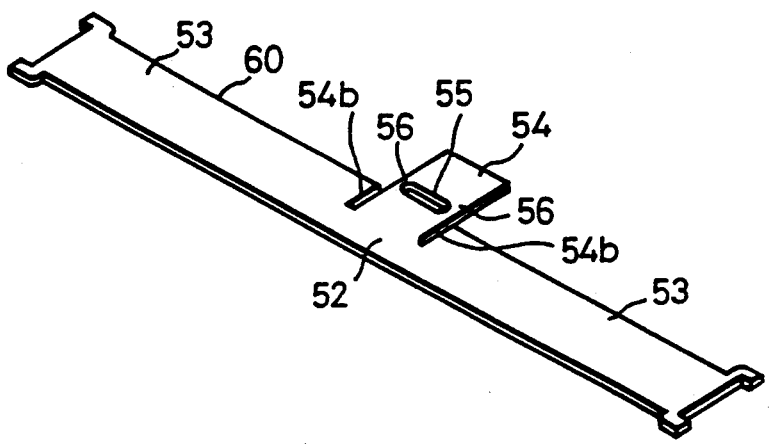
FIG. 11 is a perspective view illustrating an arm member used in the third embodiment of the objective lens moving actuator according to the present invention in an expansion fashion.

As illustrated in FIG. 11 of the accompanying drawings, an arm material 60 of a flat plate configuration is formed of a metal thin plate which is processed by the press-treatment and the punch-out treatment not shown. The first and second support arm members 53, 54 are in the expanded state and parts of the second support arm member 54 are formed as recess portion 54b, 54b which reach the central portion of the first support arm members 53. In the thus finished arm material 60, the hook portions 53a, 53a formed on the outer end portions of the first support arm members 53, 53 and the hook portion 54a formed on the outer end portion of the second support arm member 51a are bent at a right angle (see FIG. 12). Thereafter, the first support arm members 53, 53 are both bent at a right angle along the recess portions 54b, 54b for the connecting portion 52 in a parallel opposing fashion and the second support arm member 54 is bent at a right angle for the connecting portion 52 in the opposite direction to the first arm members 53, 53, thereby the forming of the arm member 51a being finished as shown in FIG. 13. After the forming of the arm member 51a is finished, the first and second arm members 53, 54 are molded to the attachment portions 57, 58 and the reinforcing member 59 is molded on the connecting portion 52 by the resin molding machine.

Then, as shown in FIG. 10, the suspension arm 51 thus arranged is assembled into an optical pickup device such that the attachment portion 57 formed on the first support arm members 53, 53 by the resin molding process is molded to the fixed support member 61 and the attachment portion 58 molded on the second support arm member 54 is molded onto the movable member 63 having the objective lens 62.

When a predetermined focusing current is applied to the focusing coil to move the objective lens 62 in its optical axis direction, in the suspension arm 51 the first supporting arm members 53, 53 are flexed in the focusing direction to thereby control the objective lens 62 in a focusing fashion. Also, when a predetermined tracking current is applied to the tracking coil to move the objective lens 62 in the direction perpendicular to the optical axis direction thereof, in the second support arm member 54, the resilient displacement portions 56, 56 thereof are flexed in the tracking direction to thereby control the objective lens 62 in a tracking fashion.

Figure 14:
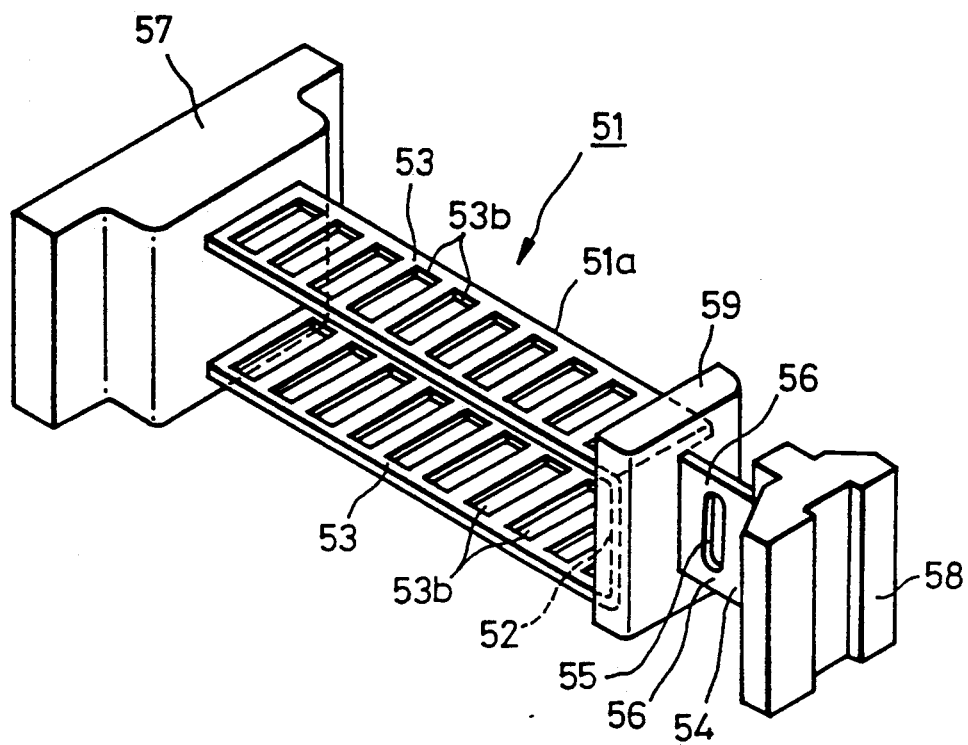
FIG. 14 is a perspective view illustrating a fourth embodiment of the objective lens moving actuator according to the present invention.

FIG. 14 of the accompanying drawings shows a perspective view of the suspension arm 51 according to a fourth embodiment of the present invention.

As shown in FIG. 14, the first supporting arm members 53, 53 of this suspension arm 51 have a plurality of punched-out holes 53b formed in the width direction thereof. According to this structure of the suspension arm 51, the spring constant of the first supporting arm members 53, 53 can be adjusted. By way of example, the spring constant of the first supporting arm members 53, 53 can be varied by adjusting a ratio of the punched-out area of the punched-out hole 53b relative to the area of the first supporting arm members 53, 53. Further, the spring constant changes depending on the material of and the thickness of the first supporting arm members 53, 53. In this case, it is possible to obtain a predetermined spring constant by adjusting the number of and the punched-out area of the punched-out holes 53b.

In accordance with the third and fourth embodiments of the present invention, since the suspension arm is formed of the metal thin plate, the suspension arm itself can be prevented from being expanded or contracted even if an ambient temperature is changed after the assembly is finished or the skew angle of the objective lens is adjusted as in this invention. Therefore, it is possible to obtain a highly reliable optical pickup device of high accuracy which can prevent the skew angle of the objective lens from being adjusted erroneously and which can suppress the optical axis of the objective lens from being inclined.

The present invention is not limited to the above-mentioned embodiments and various modifications and variations could be effected therein without departing from the gist of the present invention. For example, while the shaft 24 is provided on the attachment support member 4 and the hole 25, which is engaged with the shaft 24, is bored through the rear plate 16 of the chassis 10 in the angle adjustment coupling portion according to the first embodiment shown in FIG. 2, the present invention is not limited thereto and the shaft 24 might be formed on the rear plate 16 and the hole 25, which is engaged with the shaft 24, might be bored through the attachment supporting member 4.

Further, in the second embodiment shown in FIG. 5, similarly as described above, an inwardly-projecting convex spherical portion might be formed on the rear plate 16 and a concave spherical portion with which the convex spherical portion is engaged might be formed on the attachment supporting member 4 with similar operation being performed.

Furthermore, the arrangement of the angle adjustment coupling portion is not limited to those shown in the aforesaid embodiments and any arrangement might be possible insofar as the attachment supporting member 4 can adjust the angle of the optical axis of the objective lens relative to the supporting portion surface parallel to the optical axis of the objective lens disposed in the chassis 10.

As described above, according to the objective lens moving actuator according to the present invention, since the objective lens can be adjusted in angle together with the attachment supporting member by the angle adjustment coupling portion disposed on the attachment supporting member and the rear plate of the chassis of the bi-axial actuator, the angle adjusting mount disposed on the conventional optical pickup can be removed, thereby reducing the height of the optical pickup device. Thus, the thickness of the optical disc player can be reduced more.

Further, since the angle adjusting mount is eliminated, the concave surface cradle machined in the slide base for receiving the angle adjustment mount can be removed unlike the prior art. Therefore, the metal mold for molding the slide base can be simplified.

Furthermore, since the objective lens moving actuator according to the present invention makes effective use of the attachment supporting member which serves as the supporting mechanism of the suspension arm which resiliently supports the objective lens, the number of assembly parts can be reduced and the optical pickup device can be simplified. Also, the objective lens moving actuator of the present invention can be made inexpensive.

Having described preferred embodiments of the invention with reference to the accompanying drawings, it is to be understood that the invention is not limited to those precise embodiments and that various changes and modifications could be effected therein by one skilled in the art without departing from the spirit or scope of the novel concepts of the invention as defined in the appended claims.

What is claimed is:

1. An objective lens moving actuator comprising:
   (a) a movable member for supporting an objective lens;
   (b) resilient supporting means for resiliently supporting said movable member together with said objective lens such that said movable member having said objective lens can be moved in a first direction parallel to an optical axis of said objective lens and in a second direction perpendicular to said optical axis of said objective lens;
   (c) a fixing member to which a base end of said resilient supporting means is fixed;
   (d) electromagnetic drive means for moving said resilient supporting means in said first and second directions together with said objective lens; and
   (e) adjusting means for rotating said resilient supporting means such that the optical axis of said objective lens has a predetermined skew angle.

2. The objective lens moving actuator according to claim 1, wherein said adjusting means comprises a convex portion disposed on said base end of said resilient supporting means and a concave portion disposed on said fixing member.

3. The objective lens moving actuator according to claim 2, wherein said convex portion of said adjusting means is formed as a cylindrical portion and said concave portion is formed of an opening portion into which said cylindrical portion is engaged.

4. The objective lens moving actuator according to claim 1, wherein said convex portion of said adjusting means is formed as a spherical portion and said concave portion is formed of a concave spherical portion which receives said spherical portion.

5. The objective lens moving actuator according to claim 1, further comprising an attachment member for attaching said resilient supporting means to said fixing member, wherein said attachment member holds said resilient supporting means and said fixing member such that said resilient supporting means becomes freely rotatable relative to said fixing member.

6. The objective lens moving actuator according to claim 1, wherein said resilient supporting means comprises a pair of metal plate-shaped portions for moving said movable member in said first direction parallel to said optical axis of said objective lens together with said objective lens and a resilient displacement portion made of synthetic resin formed on one ends of said pair of metal plate-shaped portions for moving said movable member in said second direction perpendicular to said optical axis.

7. An objective lens moving actuator comprising:
   (1) a movable member for supporting an objective lens;
   (2) resilient supporting means for resiliently supporting said movable member together with said objective lens such that said movable member having said objective lens can be moved in a first direction parallel to an optical axis of said objective lens and in a second direction perpendicular to said optical axis of said objective lens;
   (3) a fixing member having a first plane portion and a second plane portion formed vertically with respect to said first plane portion, a base end of said resilient supporting means being fixed to said second plane portion; and
   (4) electromagnetic drive means for moving said resilient supporting means in said first and second directions together with said objective lens, wherein said resilient supporting means is rotatably attached to said second plane portion so that the optical axis of said objective lens has a predetermined skew angle.

8. The objective lens moving actuator according to claim 7, further comprising adjusting means disposed, between said base end of said resilient supporting means and said fixing member for rotating said resilient supporting means such that the optical axis of said objective lens has a predetermined skew angle.

9. The objective lens moving actuator according to claim 8, wherein said adjusting means comprises a convex portion disposed on said base end of said resilient supporting means and a concave portion disposed on said fixing member.

10. The objective lens moving actuator according to claim 9, wherein said convex portion of said adjusting means is formed as a cylindrical portion and said concave portion is formed of an opening portion into which said cylindrical portion is engaged.

11. The objective lens moving actuator according to claim 9, wherein said convex portion of said adjusting means is formed as a spherical portion and said concave portion is formed of a concave spherical portion which receives said spherical portion.

12. The objective lens moving actuator according to claim 7, wherein said electromagnetic drive means comprises a first coil portion for moving said movable member in said first direction together with said objective lens, a second coil portion for moving said movable member in said second direction together with said objective lens and magnet portions disposed in an opposing relation to said first and second coil portions, ones of said magnet portions and said first and second coil portions being disposed on said first plane portion and the other of said magnet portions and said first and second coil portions being disposed on said movable member.

13. The objective lens moving actuator according to claim 7, wherein said resilient supporting means comprises a pair of metal plate-shaped portions for moving said movable member in said first direction parallel to said optical axis of said objective lens together with said objective lens and a resilient displacement portion made of synthetic resin and formed on one ends of said pair of metal plate-shaped portions for moving said movable member in said second direction perpendicular to said optical axis.

* * * * *